D. HUARD & C. M. DUNBAR.
Trolling Fish-Hooks.
No. 151,394.
Patented May 26, 1874.
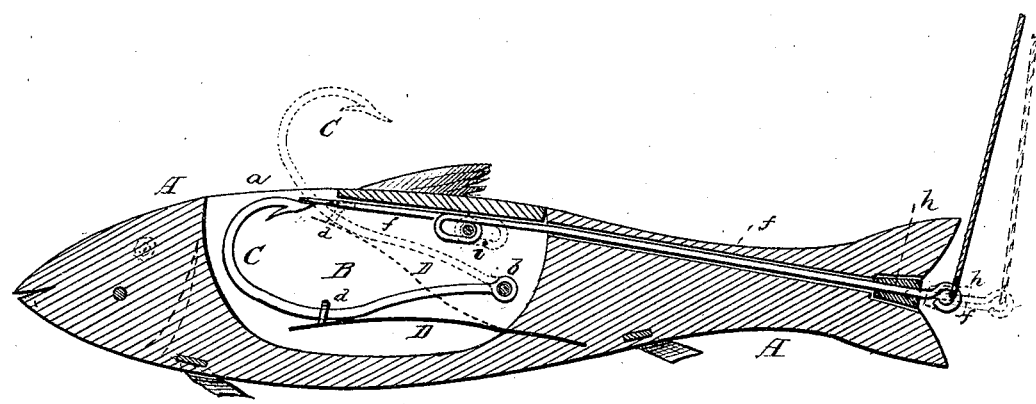
WITNESSES:
INVENTORS
David Huard
Charles M. Dunbar
per
C. H. Watson & Co.
ATTORNEYS

UNITED STATES PATENT OFFICE.

DAVID HUARD AND CHARLES M. DUNBAR, OF ASHLAND, WISCONSIN.

IMPROVEMENT IN TROLLING FISH-HOOKS.

Specification forming part of Letters Patent No. 151,394, dated May 26, 1874; application filed April 13, 1874.

*To all whom it may concern:*

Be it known that we, DAVID HUARD and CHARLES M. DUNBAR, of Ashland, in the county of Ashland and State of Wisconsin, have invented certain new and useful Improvements in Fish-Hooks; and we do hereby declare that the following is a full, clear, and exact description thereof, reference being had to the accompanying drawings and to the letters of reference marked thereon, which form a part of this specification.

The nature of our invention consists in the construction and arrangement of a spring fish-hook, arranged in a decoy-fish, for trolling or still-water fishing, as will be hereinafter more fully set forth.

In order to enable others skilled in the art to which our invention appertains to make and use the same, we will now proceed to describe our construction and operation, referring to the annexed drawing, in which the figure is a longitudinal vertical section.

A represents an imitation of a fish, made of wood or other suitable material, in two longitudinal parts, united together by small pins or screws. Within the fish A is a recess, B, with a slot, $a$, through the neck of the fish. C represents an ordinary fish-hook, pivoted within the recess B by a pin, $b$, through the ring of the hook, and so arranged that the hook end can be thrown out through the slot $a$. The hook is thrown outward by means of a spring, D, having a loop, $d$, at its outer end for the hook to slide in. $f$ is the wire that holds the hook, and to which the line is attached. This wire passes through the fish substantially in the manner shown in the drawing, its front end projecting at the rear end of the slot $a$ over the point of the hook, to hold the same down within the fish when depressed therein. At the tail of the fish there is a rubber plug, $h$, attached to the wire $f$, to tightly close this aperture, and within the fish is a loop or other guide, $i$, formed on or attached to the wire to keep it in proper position, and prevent the wire from being pulled out. When the fish grasps the decoy, the said decoy is pulled, releasing the hook from the end of the wire, so that the spring will throw it outward and catch the fish.

This device is handy to carry about in the pocket, and in fishing among logs and weeds there are no hooks exposed to catch everything in their way, causing broken lines, and other trouble and annoyance.

Having thus fully described our invention, what we claim, and desire to secure by Letters Patent, is—

1. An artificial decoy-fish, A, provided with a concealed fish-hook, C, operated by a spring, D, all substantially as and for the purpose specified.

2. The combination of the pivoted fish-hook C, spring D, loop $d$, and wire $f$, with plug $h$ and guide $i$, all constructed as described, and arranged in a decoy-fish, A, having interior recess B and slot $a$, substantially as and for the purposes herein set forth.

In testimony that we claim the foregoing as our own we affix our signatures in presence of two witnesses.

DAVID HUARD.
CHARLES M. DUNBAR.

Witnesses:
SIMON DERMARCHOIS,
NAPOLION LAROETZ.